United States Patent [19]

Payne

[11] 4,007,895
[45] Feb. 15, 1977

[54] INERTIAL ESCAPE SYSTEM

[76] Inventor: Peter R. Payne, Box 282 Rte. 5, Annapolis, Md. 21401

[22] Filed: Mar. 31, 1975

[21] Appl. No.: 563,903

[52] U.S. Cl. .................. 244/138 R; 244/141; 244/122 A
[51] Int. Cl.² .................. B64D 25/08
[58] Field of Search .......... 244/138 R, 141, 142, 244/145, 149, 122 R-122 AH

[56] References Cited
UNITED STATES PATENTS

| 3,158,344 | 11/1964 | Koochembere | 244/122 AG |
|---|---|---|---|
| 3,355,127 | 11/1967 | Stanley et al. | 244/122 AD |
| 3,646,847 | 3/1972 | Drew | 244/141 X |
| 3,807,671 | 4/1974 | Stencil | 244/138 R |
| 3,841,590 | 10/1974 | Valentine | 244/138 R |

Primary Examiner—Trygve M. Blix
Assistant Examiner—Galen Barefoot
Attorney, Agent, or Firm—Sughrue, Rothwell, Mion, Zinn & Macpeak

[57] ABSTRACT

A system for ejection of a crew member from an aircraft is disclosed. In one embodiment a mass is fired from a mortar or similar ejection device and the mass has attached to it a pendant which is resilient. As the pendant reaches the limit of its length as a result of the motion of the mass, the stretch force therein pulls down the seat pan upon which the crew member is resting and a divestment device is actuated. The crew member is then accelerated upward and out of the aircraft. Once the crew member is clear of the aircraft, the pendant's weak link separates just before the peak loading is reached and the action of the pendant initiates deployment of the parachute. The mass and pendant then separate and carry on out of the area of the pilot in a ballistic trajectory. In a second embodiment of the invention, a slipping clutch mechanism is utilized such that as the pendant runs off the clutch spool, and tightens, the pendant spool begins to rotate against the clutch torque feeding out more line. The upward force exerted by the clutch on the crew member's harness ejects him out of and away from the aircraft. When the end of the line on the spool is reached, the ball continues on by itself in a ballistic trajectory away from the escape area. As in the first embodiment, the run-off of the pendant from the clutch spool begins the deployment sequence of the crew member's parachute.

9 Claims, 7 Drawing Figures

U.S. Patent  Feb. 15, 1977  4,007,895
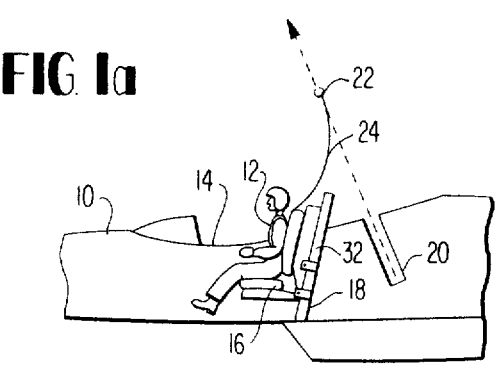
FIG. 1a
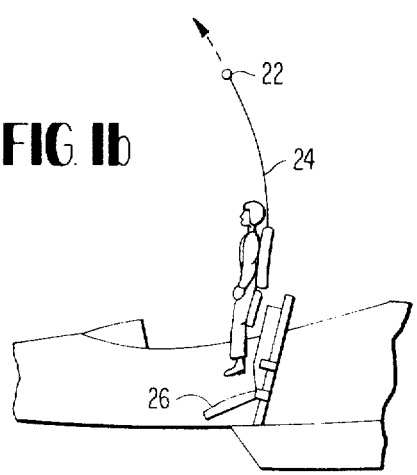
FIG. 1b
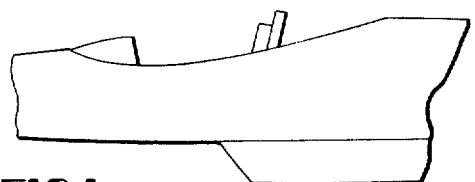
FIG. 1c
FIG. 1d
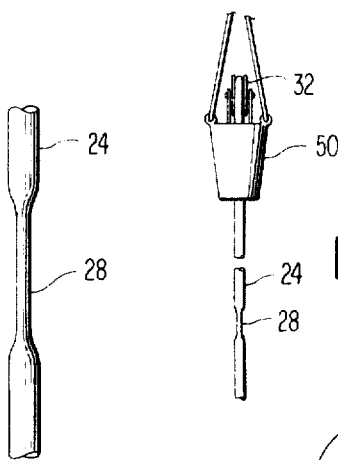
FIG. 2
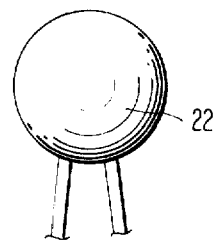
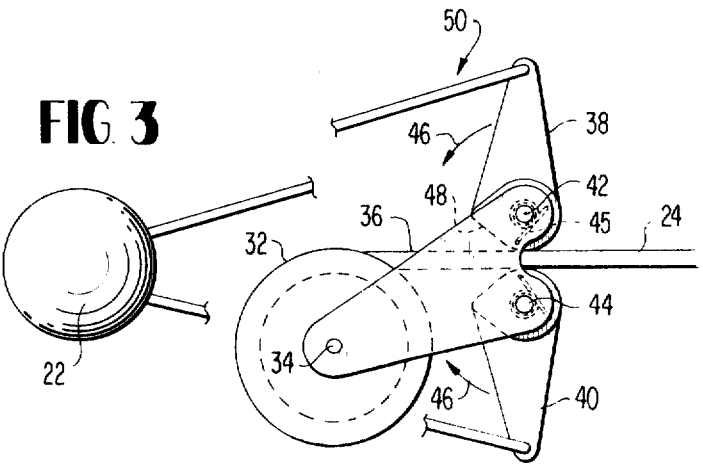
FIG. 3
FIG. 4

INERTIAL ESCAPE SYSTEM

BACKGROUND OF THE INVENTION

1. Field of the Invention

This invention relates to the field of escape mechanisms for aircraft.

2. Prior Art

Within the prior art a variety of systems and devices are known which functions as crew escape systems. During World War II, the original ejection seats were developed for use by the German Air Force. These were the original open ejection seats and following their development, two distinct lines of research ensued. The most direct development of the open ejection seat was an encapsulated seat in which the crew member was completely surrounded by protective structure and was first put into service with the General Dynamics B-58 aircraft. The encapsulated seat could function either as a shelter on land or used in water as a lifeboat. A variation of the encapsulated seat is the flyable ejection seat (AERCAB) and some developmental work on this concept is currently underway. A third variation is the escape capsule which is, in essence, a second aircraft inside the first.

A second developmental line occurs with the use of rocket extraction as opposed to open ejection seat types of escape. The concept of using a spin-stabilized suspended rocket for deceleration was originated at Stencel Aero-Engineering Corporation in the lat 1950's and this Firm developed a system to decelerate air dropped stores just prior to impact (G PADS, for ground proximity air deceleration system). In this device, the rocket provided a force to provide an upward acceleration, thereby reducing the descent velocity. The dynamics involved were essentially those of rigid bodies using inextensible lines. This system found utilization in the concept of crew escape devices in the sense that it was realized that by attaching the rocket pendant to a parachute-type torso harness, only the crew member need be pulled from the aircraft and such an extraction could be safely effected. It appears, however, that the analysis of this system failed to realize that the dynamic and aerodynamics of the pendant could dominate the performance of the system, with the rocket oscillating on the pendant resiliency to give wide excursions of line tension. Accordingly, the stiffness of the pendant seems to have been more or less arbitrarily determined, with the unfortunate result that the rocket oscillates on it at a frequency of about 10 Hz. If damping in the line is small, the line may go slack for the first few cycles of this oscillation.

As the crew member emerges into the wind blast, a drag force acts upon those parts of his body which are exposed to the blast. Until his abdomen clears the windshield, these drag forces are all above his center of gravity so that they tend to pitch him backwards. For this system to be effective, the extraction pendant must pull the crew member forward as well as up.

A typical rocket extraction system at high speeds experiences the problem of rearward pitching motion partly because the rocket trajectory is not inclined sufficiently forward but also because the thick (typically 11 mm. diameter) pendants are blown back to a quasi-catenary shape. Even though the rocket may be pulling upward and forward at the top end of this catenary, the crew member at the other end is being pulled upward and back. It can be shown that this backward force may be as high as 900 pounds during a 600 knot escape, even though the rocket is directly above the escapee. Accordingly, the backward flip seen with such systems in high speed escapes is due partly to aerodynamic loads on the man and partly to the aerodynamic forces on the pendant. It is known that a human can withstand surprisingly high aerodynamic pressures when moving head first through a fluid, but that man is readily injured or killed if he moves feet first.

SUMMARY OF THE INVENTION

This invention relates to an escape system which minimizes the problems of danger to the crew member during egress from the aircraft. If the basic problem of getting a man away from his aircraft is studied, it can be seen that it is necessary to accelerate him in a direction which is normal to the aircraft trajectory; whether that be up, down or sideways. This acceleration can be accomplished by pulling or pushing. It is known that between 10 and 20 g. acceleration is required if the man is to be given a reasonable assurance of clearing the aircraft structure during egress. In practice, all current escape systems eject upward despite the fact that there is usually a vertical fin of the aircraft to be cleared. Sideways ejection would present severe wing clearance problems with many aircraft (although it is feasible from helicopters), and downward ejection is generally unfeasible at the low altitudes at which many escapes occur.

Having established the preferred direction, upward, the next question to be solved by a preferred escape system is whether to push or pull the man out of the cockpit. Because of his jointed deformable structure, man is not well adapted for pushing unless an auxiliary support structure such as a chair is provided. Current escape systems using an aircraft seat show that at higher accelerations needed for escape, so long as the torso and back muscles are supplanted by a shoulder harness and seat back to prevent the spine from buckling over, egress while affixed to the chair which generally rides on rails is satisfactory. The acceleration force is directly applied to the seat pan which directly accelerates the upper legs and lower torso. The supported spine pushes the upper torso and head and the lower legs are pulled by knee joints. Unfortunately, the acceleration needed to clear the aircraft induces loads in the crew member's spine which are high enough to cause a significant probability of vertebral fracture. Generally, a vertebral fracture rate of 5% is considered to be satisfactory as an alternative to a higher death rate due to fin impact. Vertebral injury rates as high as 40% have been experienced with new or modified escape systems but this has usually been traced to engineering defects in configuration, cushion dynamics and other mechanical and aerodynamic factors.

An alternative to pushing a seat out is the pulling out either the man alone or the seat-man combination as in the prior art tractor rocket system. However, the development of such a tractor rocket suitable for high speed escape is clearly a considerable undertaking which has yet to be achieved despite considerable research investments. The existing spin stabilized tractor rockets have a variety of defects during utilization. For example, they are not aerodynamically stabilized so that the pitch-up aerodynamic moments cause them to precess and roll. Additionally, because of the high drag and/or insufficient forward inclination of their trajectory, they do not fly in the right position to pull the crew member out "head first into the flow" even if the pendant line has zero aerodynamic drag. Furthermore, since rocket development is inherently expensive, rectification of these defects is likely to be expensive. Moreover, the crew member acceleration does not start until line stretch has occurred and this may be as long as 0.16 seconds after the rocket has left its mortar.

These apparent difficulties in the prior art have led to the development of an inertial escape system which employs a simple high velocity mass instead of a rocket. A pendant connecting this mass extracts the crew member and the high velocity kinetic energy of the mortared mass or ball is transformed to a physiologically tolerable acceleration on the man. This is accomplished either by having the pendant resilient or by the utilization of a slipping clutch.

Accordingly, it is an object of this invention to provide a crew escape system which enables the crew member to be ejected safely and without physical injury from an aircraft.

It is another object of this invention to provide an extractor mass which is fired at an angle well forward of the vertical and will follow an acceptable trajectory for the extraction of the crew member.

It is still another object of this invention to provide a crew escape system which is simple, reliable and inexpensive.

These and other objects and features of the invention will become apparent from a study of the following detailed description of the several embodiments.

BRIEF DESCRIPTION OF THE DRAWINGS

FIGS. 1(a), (b), (c) and (d) are schematic drawings showing the first embodiment of this invention utilizing a resilient lanyard system.

FIG. 2 is a schematic illustration of a second embodiment of this invention utilizing a slipping clutch mechanism.

FIG. 3 shows one preferred embodiment of the slipping clutch to be employed in the embodiment of FIG. 2.

FIG. 4 shows a second preferred embodiment of a friction clutch to be employed in the preferred embodiment of FIG. 2.

DETAILED DESCRIPTION OF THE PREFERRED EMBODIMENTS

FIG. 1 shows, in three distinct steps, the sequence of ejection using a resilient lanyard. In FIG. 1(a) the aircraft is generally indicated at 10 with the crew member 12 located in a cockpit 14. The crew member is generally strapped down to a seat 16 and a divestment device 18 is typically a fitting to which all of the straps which hold the pilot in the seat are attached. At a point 20 located within the fuselage 10 of the aircraft, an explosive mortar and charge is located which houses an inertial mass 22. The inertial mass is physically coupled to the crew member by means of a pendant 24 which may be made of a material such as Kevlar having a diameter of approximately .01 of an inch. The length of the pendant 24 is typically in the range of 10–30 feet. The physical properties of Kevlar are now well-known and the product is marketed by the Dupont Company in a variety of yarns. One typical type is Kevlar 49 which has the highest specific tensile strength (strength/density) of any commercially available material. As shown in FIG. 1(a), at the point immediately following the mortar firing of the inertial mass 22, the crew member remains in his seat and the pendant has not reached its fully extended position. As shown in FIG. 1(b), the seat pan 26 of the seat is pulled down by the stretch force of the pendant 24. At this point the divestment device fires and the crew member accelerates upward as a result of the inertial action of the mass 22. Conventionally, during ejection, the divestment device is actuated by an electrical pulse usually initiated by a timer and this pulse fires a small explosive charge in the device which releases all of the straps simultaneously. In the preferred embodiment of FIG. 1, it is the stretch force of the lanyard itself which causes the divestment device to be fired at the moment the seat pan is pulled down as shown in FIG. (b). In FIG. 1(c), the crew member is free of the aircraft and the momentum of the inertial mass is nearly expended. At a point just before the peak loading on the crew member is reached, a weak link 28 as shown in FIG. 1(d) separates the pendant 24 and the mass 22 from the crew member and this portion of the escape system then falls freely in a ballistic trajectory away from the crew member. The weak link may initiate the deployment sequence of the parachute 30, however, in some situations, the lanyard may merely initiate parachute opening by pulling the rip cord out in a conventional manner.

In a low air speed escape, typically below 200 knots, for example, in a helicopter, the escape system would operate at a 12 g. acceleration from the helicopter and the crew member can then clear 2 feet in 0.10 seconds. If the helicopter has a spin rate of 240° per second, it would then rotate 24° during the course of the escape. These parameters would be tolerable if the seat 16 were located on rails, as shown as number 32 in FIG. 1, and particularly so if the pendant 24 were led through a fair lead at the top of the seat rail (not shown) such that the force applied to the crew member would be parallel to the rail regardless of the line of flight of the inertial mass 22. In such an arrangement, the pendant and mass would fly clear as the seat attachment would reach the lanyard.

Typically, for a low speed escape system an order of magnitude weight estimate of the mechanism would be as follows:

Inertial mass — 10.0 pounds
Mortar and charge — 3.5
Pendant — .5
Divestment and control device — 2.0
Hinged seat pan and actuator — 4.0
Primacord, housing and controls — 10.0
Total escape system weight — 30 pounds.

In the situation of a ballistic escape at high forward speeds, again it is assumed that the crew man is constrained in the horizontal direction by rails 32 while in the cockpit 14. If a 20 pound mass is used as the inertial mass 22, and the trajectory of this mass is 1,000 feet/second at an inclination of 10° forward of the vertical as shown by the position of mortar 20 in FIG. 1(a), at an aircraft speed of 600 knots, the system functions but allows the crew member to move backward relative to the aircraft axis. When the crew member is 10 feet back he has cleared the cockpit exit plane by 12 feet.

The resilient lanyard system of FIG. 1 can be used effectively for low speed escape (less than 350 knots) and in situations where the aircraft roll rate is less than 50°–100°/second during the escape. The principal disadvantage of the resilient lanyard is the lag in generating upward acceleration to the crew member until the lanyard is fully extended.

In contrast, the second preferred embodiment as shown in FIG. 2, a slipping clutch system transmits the full upward acceleration to the crew member almost instantaneously (about 1 millisecond) and removes him from the cockpit so rapidly that roll rates of over 300°/second may be tolerable without special lateral support provisions. As shown in the drawings, the escape mechanism and ejection sequence is nearly identical to the FIG. 1 embodiment with one important deviation. As in the prior embodiment, the crew member 12 is strapped down to seat 16 by means of a series of straps coupled to a divestment device 18. A mortar 20 houses the inertial mass 22 coupled to the crew member 12 by means of a resilient pendant 24. The pendant is housed in a slipping clutch mechanism 50 which is interposed between the crew member 12 and the inertial mass 22. Because the pendant 24 is mounted on a spool, to be described later, the upward force of the mass 22 is almost immediately transferred to the crew member 12 as the spool deploys through the action of the clutch.

As shown in FIG. 1(b) the divestment device 18 is fired as the seat pan is pulled down and the crew member is accelerated upward out of the cockpit 14. At a point where the crew member is clear of the aircraft, as shown in FIG. 1(c) the end of the lanyard 24 runs off the clutch spool 32 and the parachute 30 may then be deployed. A section of reduced diameter 28 interposed between the lanyard and the parachute is used as in the FIG. 1 embodiment to extract the parachute and then release when the total maximum force on the lanyard 24 is reached.

In summary then, the ejection sequence of either FIG. 1 or FIG. 2 can immediately be broken down into four distinct phases. The first phase is the firing phase and lasts from the time that which the system is fired to eject the inertial mass 22 until the time that the lanyard 24 becomes taut. The inertial mass 22 is acted on by the forces of gravity and air drag and during this phase the crew member remains in his seat. The second phase may be deemed the stretch phase. In this phase, the inertial mass stretches the pendant until the tension is sufficient to lift the crew man from his seat. A small retention force may be used to hold the man in his seat until a positive life force is obtained. This may be by delaying the deployment of the divestment device for a specified length of time (on force increment) after firing of the mortar. The damping characteristics of the line may be such that the line tension reaches the lift-off value immediately after becoming taut.

The third phase may be deemed the separation from the vehicle phase. This is the crucial aspect of the escape operation. The inertial mass continues its upward flight, maintaining tension in the line and the crew man is lifted clear of the aircraft. The tension force decelerates the inertial mass very rapidly.

The fourth phase is the free fall or free flight phase when the crew man is now clear of the aircraft in free flight and no longer under the influence of the tow line. In this phase, the inertial mass has separated from the crew man and remains in a ballistic trajectory away from the man and the aircraft.

FIG. 3 shows one preferred embodiment of a clutch mechanism which may be used as element 50 in the preferred escape system of FIG. 2. As shown in FIG. 3, the elastic pendant 24, typically a length approximately 200 feet of .10 inch diameter Keviar, is wound around a drum 32. Attached to the top of the drum 32 is an arm 36 which is operably coupled to two cam elements 38, 40 which frictionally engage the pendant 24. Cam elements 38 and 40 are journaled for rotation about axes 42, 44 such that in response to force from the acceleration of the inertial mass, rotation of cams 38, 40 takes place to frictionally engage pendant 24. Each cam is coupled to the inertial mass 22 by means of a resilient pendant one-half the diameter of pendant 24 via an operative link at the end of the cam. Springs 45 are employed to bias the cams in an open position and prevent the locking of the cams against the pendant. The inertial force causes movement of the cams in a direction as shown by the arrow 46 such that flat sides 48 on each cam provide a greater effective length of frictional engagement along element 24. In operation, the length of pendant on spool 32 is deployed by rotation about pin 34 as a result of the inertial force generated by the firing of mass 22 with the clutch mechanism providing a degree of frictional engagement into the system to allow the extraction of the crew member while still facilitating deployment of the remaining length of the pendant.

FIG. 4 shows a second embodiment of a frictional clutch for use in the FIG. 2 escape system. As in the prior cam system, the pendant is denoted as element 24 and the clutch generally shown as 50 in FIG. 4. The clutch 50 is coupled to the inertial mass 22 by means of two elements of the lanyard each one half the diameter of the pendant 24. As shown in FIG. 4, the frictional clutch comprises mainly a conical sleeve 51 having a pair of shoes 52 which engage lanyard 24 inside the housing 50. A retention washer 54 operably transfers the compressive force generated by a small spring 56 to the shoes 52. The deployment drum 32 coupled to the housing 50 by arms 58, 60 allows for the storage of the pendant and the deployment thereof while passing through the frictional engaging shoes 52 of the clutch 50. In the FIG. 4 embodiment, a uniform frictional force constantly acts upon the deploying lanyard 24 as it is unrolled from the spool 32 to enable the transfer of momentum from the movement of the inertial mass 22 to facilitate the escape of the crew man from the cockpit. In both the FIG. 3 and FIG. 4 operations, it is apparent that a "weak link" is present between the pendant 24 and crew man 12 and is configured for release just before the peak force upon the system is reached. Additionally, although the crew man is removed from the cockpit by a direct coupling to the pendant 24, it is readily apparent that the pendant could also be coupled to the seat and the crew man could be pulled out of the seat in a conventional escape trajectory while merely riding out of the cockpit on the rails to which the seat is mounted.

Although the present invention has been described in conjunction with the preferred embodiments, it is to be understood that modification and variations may be resorted to without departing from the spirit and scope of the invention as those skilled in the art would readily understand. Such modifications and variations are considered to be within the purview and scope of the invention and the appended claims.

What is claimed is:

1. A system for the ejection of a crew member from an aircraft comprising:
   a mass disposed in said aircraft and disposed for ejection therefrom;

means for ejecting said mass;

A Kevlar pendant coupled between said mass and said crew member; and means for releasing said pendant and said mass from said crew member when said crew member has cleared the aircraft, said means for releasing comprising a section of said pendant of reduced diameter sized to part when the peak loading is reached on the pendant.

2. A system for the ejection of a crew member from an aircraft comprising:

a mass disposed in said aircraft and disposed for ejection therefrom;

means for ejecting said mass;

a pendant coupled between said mass and said crew member;

means providing a substantially constant friction force to said pendant for controlling the deployment of said pendant; and means for releasing said pendant and said mass from said crew member when said crew member has cleared the aircraft.

3. The system of claim 2 further including means for holding the crew member in the aircraft until the pendant has been extended to its full length as a result of the ejection of said mass.

4. The system of claim 2 including means for deploying a parachute when the crew member has cleared the aircraft.

5. The system of claim 2 wherein said means for controlling the deployment of said pendant includes a spool upon which said pendant is wound, and said frictional means are interposed between said spool and said crew member to retard the run out of the pendant from the spool.

6. The system of claim 5 wherein said frictional means includes a pair of cam elements disposed on opposite sides of the pendant, spring means biasing said cam elements into an open position, means linking said cam elements to said mass and an arm coupling said cam element to said spool.

7. The system of claim 5 wherein said frictional means includes a conical sleeve through which said pendant passes, a series of shoes located within said sleeve and disposed on opposite sides of said pendant, said spool being located on said sleeve and means linking said sleeve to said mass.

8. The system of claim 2 wherein said pendant is coupled directly to said crew member.

9. The system of claim 2 wherein said pendant is coupled to a parachute worn by said crew member.

* * * * *